United States Patent
Léran et al.

(10) Patent No.: US 12,441,556 B2
(45) Date of Patent: Oct. 14, 2025

(54) APPARATUS FOR TRANSFERRING OBJECTS

(71) Applicant: EGG-CHICK AUTOMATED TECHNOLOGIES, Landivisiau (FR)

(72) Inventors: Frédéric Léran, Landivisiau (FR);
Bertrand Malet, Landivisiau (FR);
Steven Talarmin, Landivisiau (FR);
Lionel Rolland, Landivisiau (FR)

(73) Assignee: EGG-CHICK AUTOMATED TECHNOLOGIES, Landivisiau (FR)

( * ) Notice: Subject to any disclaimer, the term of this patent is extended or adjusted under 35 U.S.C. 154(b) by 110 days.

(21) Appl. No.: 18/555,736

(22) PCT Filed: Apr. 14, 2022

(86) PCT No.: PCT/FR2022/050711
§ 371 (c)(1),
(2) Date: Oct. 23, 2023

(87) PCT Pub. No.: WO2022/223913
PCT Pub. Date: Oct. 27, 2022

(65) Prior Publication Data
US 2024/0199350 A1 Jun. 20, 2024

(30) Foreign Application Priority Data
Apr. 19, 2021 (FR) ...................................... 2104050

(51) Int. Cl.
*B65G 47/91* (2006.01)
*A01K 43/00* (2006.01)
(Continued)

(52) U.S. Cl.
CPC .......... *B65G 47/918* (2013.01); *A01K 43/005* (2013.01); *B25J 15/0625* (2013.01);
(Continued)

(58) Field of Classification Search
CPC ...... B65G 47/91; B65G 47/918; B65G 45/22; B65G 47/914; B65G 2201/0208; A01K 43/005; B25J 15/0625
See application file for complete search history.

(56) References Cited

U.S. PATENT DOCUMENTS

| | | | |
|---|---|---|---|
| 5,881,860 A | 3/1999 | Zecchi et al. | |
| 8,202,079 B2 * | 6/2012 | Litzenberg | B65G 29/00 198/470.1 |

(Continued)

FOREIGN PATENT DOCUMENTS

| | | | | |
|---|---|---|---|---|
| FR | 3088063 B1 * | 11/2020 | ............ | A01K 43/04 |
| WO | 2016042394 A1 | 3/2016 | | |

(Continued)

OTHER PUBLICATIONS

International Search Report and Written Opinion in International Application No. PCT/FR2022/050711 with partial translation. Aug. 29, 2022.

*Primary Examiner* — James R Bidwell
(74) *Attorney, Agent, or Firm* — Heslin Rothenberg Farley & Mesiti P.C.

(57) ABSTRACT

An apparatus for transferring objects is disclosed. The apparatus comprises an object take-off roller (10) equipped with members (11) for individually gripping objects. The apparatus comprises at least a linear actuator (13), placed in the interior volume defined by the roller. This actuator (13) moves a gripping member (11) with its free end movable between a folded position and a deployed position. In this last position, this free end contacts a gripping member (11). This actuator (13) being rotationally mobile between an engaged position and a disengaged position, is freely moved between these positions when it comes into contact with another gripping member (11) in its rest position. A return member (15) returns the actuator to its engaged position (Continued)

when its free end is in a position in which it is not able to interact with a gripping member (11) in its rest position.

15 Claims, 3 Drawing Sheets

(51) Int. Cl.
*B25J 15/06* (2006.01)
*B65G 45/22* (2006.01)

(52) U.S. Cl.
CPC ........... *B65G 45/22* (2013.01); *B65G 47/914* (2013.01); *B65G 2201/0208* (2013.01)

(56) References Cited

U.S. PATENT DOCUMENTS

| | | | | |
|---|---|---|---|---|
| 2004/0094979 | A1* | 5/2004 | Damhuis | B25J 15/0616 |
| | | | | 294/65 |
| 2018/0235187 | A1* | 8/2018 | Suh | B65G 47/907 |
| 2021/0179366 | A1* | 6/2021 | McCoy, Jr. | B65G 47/918 |

FOREIGN PATENT DOCUMENTS

| | | | | |
|---|---|---|---|---|
| WO | 2020094958 A1 | 5/2020 | | |
| WO | WO-2020230069 A1 * | 11/2020 | ............. | B65G 29/00 |

\* cited by examiner

APPARATUS FOR TRANSFERRING OBJECTS

CROSS REFERENCE TO RELATED APPLICATIONS

This application is a U.S. National Phase filing under 35 U.S.C. § 371 of International Application PCT/FR2022/050711, filed Apr. 14, 2022, and published as WO 2022/223913 A1 on Oct. 27, 2022. PCT/FR2022/050711 claims priority from France application number 2104050, filed Apr. 19, 2021. The entire contents of each of these prior applications are hereby incorporated herein by reference.

TECHNICAL FIELD

The present invention relates to an apparatus for transferring moving objects on a conveyor.

It also relates to an installation for processing eggs placed in containers moving on a high speed processing line.

PRIOR ART

It is known in the field of poultry farming, in particular in chick production, to use the optical properties of the eggs to differentiate between them and bypass during processing the eggs identified as being unlikely to hatch and produce a chick.

The latter, referred to as "non-viable," are essentially infertile eggs or fertilized eggs but whose egg embryo is dead or else malformed.

This differentiation is necessary to minimize the losses of vaccines during in ovo processing, that is, during injection of the egg by vaccine needle through the shell in order to promote its hatching and to prevent the appearance of diseases.

Thus, once this differentiation step is carried out, for example by a candling method, it is useful to remove the non-viable eggs from the circuit so as not to send them to processing stations reserved for the fertilized eggs alone.

Object transfer devices are known for gripping certain items from a set of objects moving on a conveyor, such as defective parts, in order to transfer them to a discharge conveyor.

Such an object transfer device typically comprises a take-off roller rotating on itself, which has, on its outer surface, gripping tools spaced apart from one another and extending radially in order to individually and selectively grasp objects to be removed from among objects moving along.

Purely by way of illustration, these individual gripping tools are formed from a rod at the end of which a suction cup is placed, this rod being received slidably in an orifice of the take-off roller so as to be movable between a rest position in which this suction cup is pressed against the external surface of the roller and a gripping position in which this suction cup protrudes from said roller to grip an object moving along.

The movement of the gripping tool between these two extreme positions is obtained by a cylinder placed inside the roller and whose actuator rod bears against the free end of the rod of the gripping tool when said tool, driven by the rotating roller, is presented opposite the pneumatic cylinder.

However, when an object is recovered by such an individual gripping tool, the take-off roller continuing to rotate, if the actuator rod of the cylinder does not return quickly to its initial position or if the cylinder is defective, it can be seen that said cylinder is violently struck by the rod of a subsequent gripping tool, in its rest position, carried opposite the cylinder by the rotation of the take-off roller.

This results in deterioration of the cylinder requiring a complete shut-down of the object transfer device for maintenance, which of course is detrimental to the speed that can be reached by the processing line.

This also results in costs that are incompatible with industrial exploitation.

There is therefore a pressing need for a device for transferring objects moving along on a conveyor belt, eggs in particular, the original design of which makes it possible to overcome the disadvantages of the prior art described above.

SUBJECT MATTER OF THE INVENTION

The present invention aims to overcome the disadvantages of the prior art by proposing a device for transferring objects, which is simple in its design and operating mode, offering increased reliability, that is to say that substantially improves its service life.

Another object of the present invention is such a device for transferring objects allowing extremely fast processing rates, and by way of illustration, of more than 90,000 eggs per hour.

Yet another subject matter of the present invention is such a transfer device which is particularly easy to maintain.

The present invention also relates to an eggs processing apparatus making it possible to selectively remove eggs in containers moving along on a high-speed conveyor, for example because such eggs are defective (egg viability, egg size, etc.).

DISCLOSURE OF THE INVENTION

To this end, the invention relates to an apparatus for transferring objects comprising:
an object take-off roller comprising, on the periphery thereof, members for individually gripping said objects,
a device for rotating said object take-off roller,
said individual gripping members being arranged in at least one ring, said apparatus comprising, for each ring, a linear actuator, placed in the interior volume defined by said roller, for moving an individual gripping member appearing opposite this linear actuator between a rest position and a gripping position in which this individual gripping member extends radially, projecting from this take-off roller to grip an object, the gripping position being obtained by one free mobile end of said linear actuator bearing against said individual gripping member, said take-off roller being configured to move an individual gripping member in its rest position one by one in front of each linear actuator as it rotates.

According to the invention,
the free end of said linear actuator being mobile between a folded position and a deployed position in which this free end is in contact with an individual gripping member, this linear actuator is rotationally mobile between at least an engaged position and a disengaged position such that, with the free end of said linear actuator being in its deployed position or in an intermediate position between its deployed position and its folded position, said linear actuator is freely moved from its engaged position to its disengaged position when it comes into contact with another individual gripping member, in its rest position, carried by said rotating take-off roller, said disengaged position corresponding to a position in which said actuator is spaced apart from said individual gripping members, said assembly comprising a return member to return said actuator from its disengaged position to its engaged position when the free end of said actuator is in its folded position or in an intermediate position not able to interact with an individual gripping member in its rest position.

Advantageously, the original design of this transfer apparatus ensures a free tilting of the linear actuator in its disengaged position when its actuator rod comes into contact with an individual gripping member in its rest position. Thus, when the actuator rod of the linear actuator does not return quickly to its folded position, there is no risk of damaging this actuator. The latter then has the time necessary for its actuator rod to return to its folded position or to an intermediate position not likely to interact with the individual gripping members in their rest position.

This apparatus for transferring objects finds applications in numerous technical fields, for example in sorting parts moving along on conveyors.

Purely by way of illustration, this apparatus for transferring objects can be implemented to remove defective parts from a production line, such parts having previously been identified by means of an optical recognition system.

It can also be used for sorting fragile objects in the agri-food sector, such as eggs processed at high speeds. In this latter field, it is noted not only that the transfer apparatus of the invention has increased reliability but also allows extremely fast rates, typically greater than 90,000 eggs per hour.

According to one embodiment of this apparatus for transferring objects, said return member to return said linear actuator from its disengaged position to its engaged position is a spring member or a magnetic attraction device such as an electromagnet.

Advantageously, this spring member is a torsion spring.

According to another embodiment of this apparatus for transferring objects, it comprises, for each linear actuator, a means for detecting (16) the position of its free end, this detection means being connected to said corresponding return member to control its triggering.

Advantageously, it is a position sensor that makes it possible to detect the position of the actuator rod of the linear actuator. When this actuator rod is in a position guaranteeing the safety of the linear actuator in its engaged position, facing an individual gripping member in its rest position, a control signal can be sent to said corresponding return member to trigger the latter and thus move this linear actuator from its disengaged position to its engaged position.

According to yet another embodiment of this apparatus for transferring objects, said linear actuator is fixedly mounted on a rotatable support, this support being configured to move said linear actuator between said engaged position and said disengaged position during its rotation.

According to yet another embodiment of this apparatus for transferring objects, each of these individual gripping members comprises a piston provided at its free end with a suction cup.

Preferably, the piston of each individual gripping member is hollow and opens onto an orifice of the suction cup to create a suction head.

According to yet another embodiment of this apparatus for transferring objects, the piston of each individual gripping member being received in an orifice of said take-off roller, said apparatus comprises a pumping unit for placing a part of the inner volume of said roller under vacuum and presses the suction cups of the individual gripping members against the outer surface of said roller when these individual gripping members are rotated by said roller on a circular path segment corresponding to said inner volume part thus placed under vacuum.

By way of example, this apparatus comprises a vacuum chamber in communication with each of said orifices of the part of the take-off roller describing this circular path segment.

Preferably, each piston is received in its orifice so that it can slide freely therein.

According to yet another embodiment of this apparatus for transferring objects, said assembly for rotating this object take-off roller is configured so that the speed of rotation of the object take-off roller is greater than or equal to 20 revolutions/min and even better still at 30 revolutions/min.

According to yet another embodiment of this apparatus for transferring objects, said linear actuator is an electromechanical actuator, a pneumatic actuator or even a hydraulic actuator.

According to yet another embodiment of this apparatus for transferring objects, it comprises means for interrupting the vacuum on another circular path segment of the individual gripping members in order to release the objects thus gripped at least one predetermined deposition point.

This predetermined deposition point advantageously corresponds to the surface of a belt of another conveyor in order to evacuate the objects thus transferred.

According to yet another embodiment of this apparatus for transferring objects, it comprises a control unit for individually controlling each linear actuator in order to selectively grip one or more eggs passing simultaneously in line with individual gripping members of said take-off roller.

Each linear actuator is thus controllable so as to remove objects of interest.

According to yet another embodiment of this apparatus for transferring objects, it is configured to activate each linear actuator only when said actuator(s) are in their engaged position. In other words, when a linear actuator is in its disengaged position, its actuator rod can only return to its folded position and cannot be moved into its deployed position.

According to yet another embodiment of this apparatus for transferring objects, it comprises a cleaning device (17) placed inside said roller for jetting pressurized water into said roller when this cleaning device is connected to a pressurized water supply source.

For example, this cleaning device may be a washing spray bar provided with regularly spaced holes.

Preferably, the individual gripping members are extracted beforehand from their orifice during the washing of the roller in order to allow water to pass through these orifices.

According to yet another embodiment of this apparatus for transferring objects, it comprises in its lower part a waste water recovery tank (18), which can be connected to a waste water removal system comprising a suction pump.

Preferably, this waste water removal system and this pump are mounted on a mobile chassis such that they can be freely moved by the operator. For example, this elimination system comprises a flexible hose able to be connected to a discharge port of the waste water recovery tank. This chassis can also receive the wash water supply system intended to be connected to the cleaning device for supplying pressurized water.

It is also possible to reinject the recovered water into the recovery tank in order to rotate in a closed circuit for a period determined by the operator. Such an embodiment advantageously allows water savings.

The present invention also relates to an egg processing installation comprising an apparatus for transferring objects as described above, a first conveyor (19) for moving eggs along in line with said transfer apparatus and a second conveyor (20) to evacuate the gripped eggs from the first conveyor (19) by said egg transfer apparatus.

These eggs can of course be transported into containers moved on the first conveyor and be transferred into other containers on the second conveyor.

The apparatus for transferring objects then comprises a control unit configured to calculate the speed of rotation of the take-off roller so as to synchronize the collection of one or several eggs with the movement of the containers on the first conveyor.

This installation advantageously allows high automatic processing rates typically greater than 90,000 eggs per hour, or even greater than 100,000 eggs per hour.

Preferably, this first conveyor comprising n egg transport pathways with n greater than or equal to 2, the take-off roller comprises individual gripping members distributed in n rings, and consequently, the transfer apparatus comprises n linear actuators.

Thus, and for each transport path, the transfer apparatus comprises a linear actuator.

Advantageously, since these eggs are placed in containers, this egg processing installation comprises an egg examining device comprising at least one measuring unit through which eggs of each container pass through successive rows, and a processing unit for processing signals acquired by each measuring unit.

In one embodiment, this examining device may comprise a plurality of light sources to illuminate each egg of at least one row of cells of a container, detectors, each for receiving the light passing through an egg thus illuminated, and a processing unit for processing the light signal thus detected by the detectors.

Advantageously, these light sources are laser sources equipped with focusing means to form a concentrated optical beam in their respective egg. Purely by way of illustration, it may be laser diodes (LED) emitting in the infrared.

Preferably, from processing the light thus detected, the cell(s) of the container in which an egg is to be transferred is determined, for example because it is not viable or is defective.

This processing installation may also comprise a communication module for sending data or information obtained by processing the optical signals of a given container to the control unit of the apparatus for transferring objects so as to determine the eggs to be collected in this container and to transfer to the second conveyor for their evacuation. The examining device is placed upstream of the device to transfer objects onto the processing line, this position being identified relative to the direction of movement of the containers on the conveyor.

BRIEF DESCRIPTION OF THE DRAWINGS

Other advantages, aims and particular features of the present invention will become apparent from the following description, made, for explanatory purposes and in no way limiting, with reference to the appended drawings, in which.

DESCRIPTION OF EMBODIMENTS

The drawings and the following description essentially contain elements of a certain nature. They may therefore not only serve to better understand the present invention, but also contribute to its definition, where appropriate.

First, it should be noted that the figures are not to scale.

Figure 1:
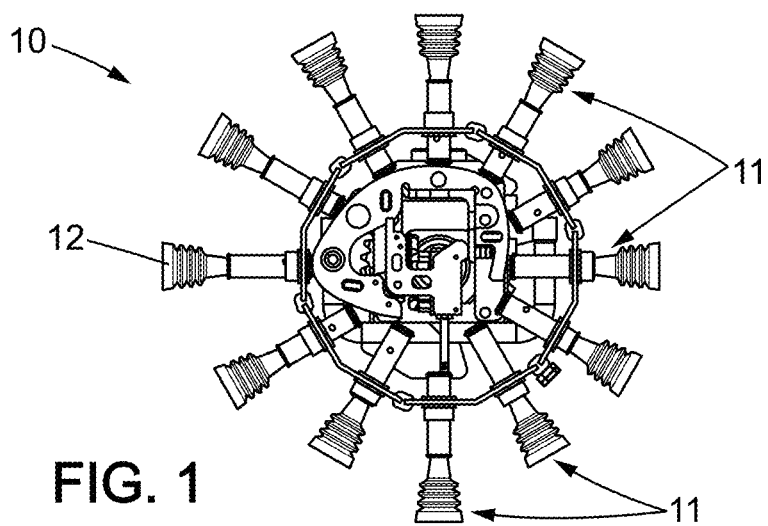
FIG. 1 is a sectional view of an apparatus for transferring objects according to a particular embodiment of the present invention.
Figure 2:
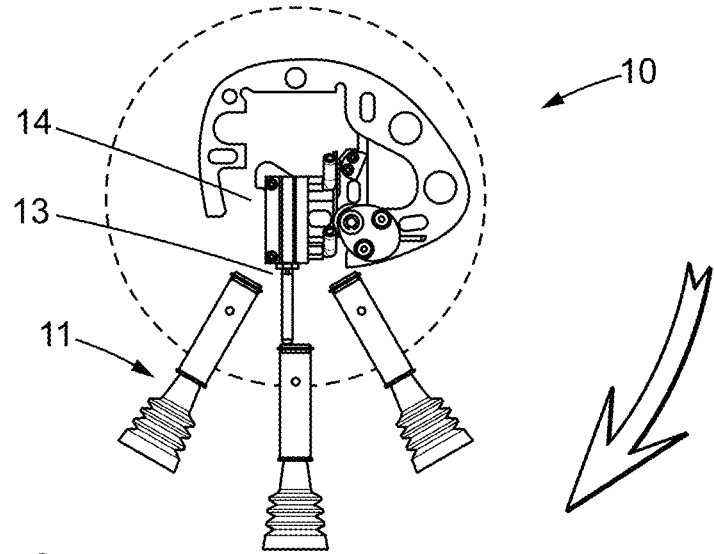
FIG. 2 is a partial schematic representation of the apparatus for transferring objects of FIG. 1, an individual gripping member being in position for gripping an egg moving under the apparatus, the actuator rod of the linear actuator being in its deployed position.
Figure 3:
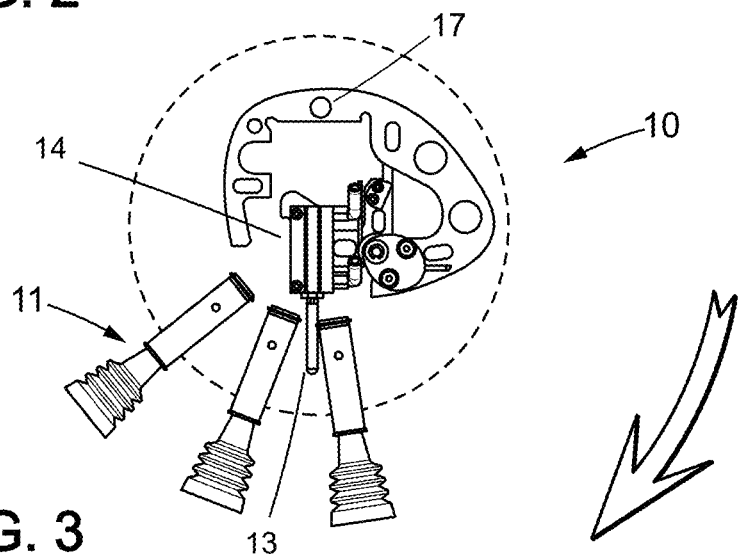
FIG. 3 is a partial schematic representation of the apparatus for transferring objects of FIG. 1, the individual gripping members being in their rest position, the actuator rod of the linear actuator being in an intermediate position between its deployed and folded positions, an individual gripping member driven by the rotating take-off roller coming into contact with this actuator rod.
Figure 4:
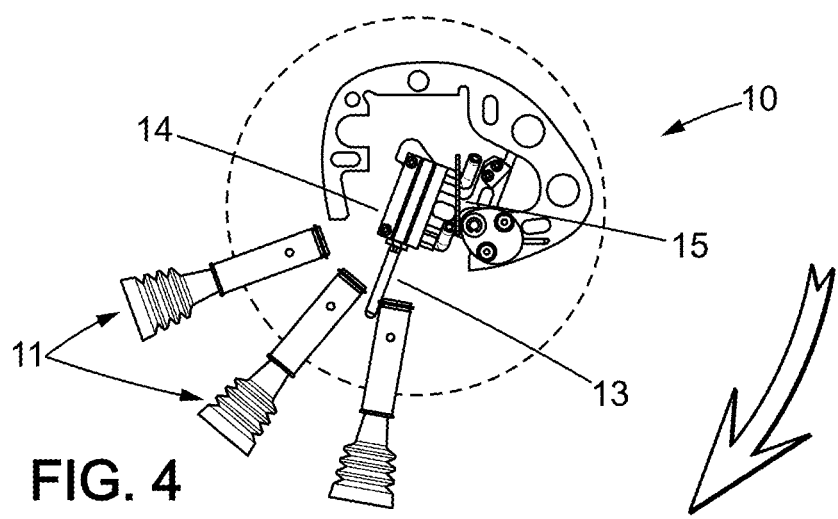
FIG. 4 is a partial schematic representation of the apparatus for transferring objects of FIG. 1, the individual gripping members being in their rest position, the actuator rod of the linear actuator being in an intermediate position between its deployed and folded positions, the linear actuator changing from its engaged position to its disengaged position by being freely driven by an individual gripping member.
Figure 5:
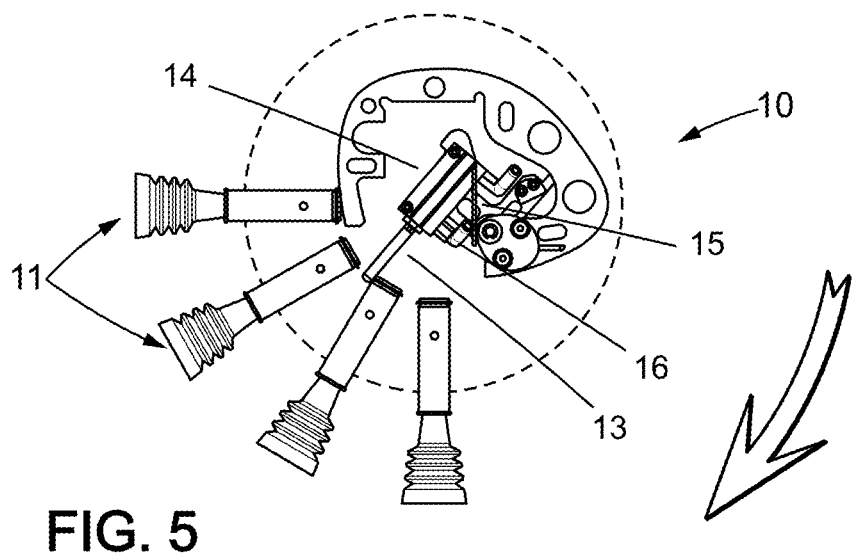
FIG. 5 is a partial schematic representation of the apparatus for transferring objects of FIG. 1, the individual gripping members being in their rest position, the actuator rod of the linear actuator being in an intermediate position between its deployed and folded positions, the linear actuator changing from its engaged position to its disengaged position by being freely driven by an individual gripping member.
Figure 6:
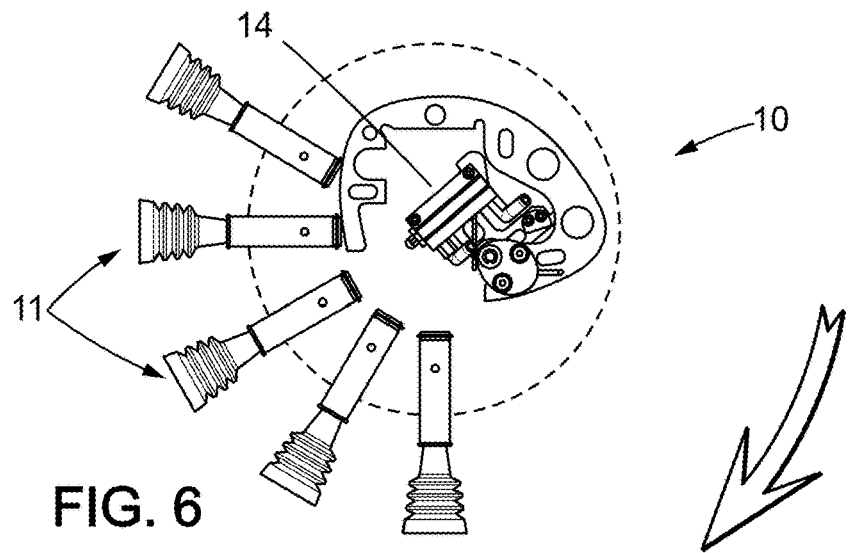
FIG. 6 is a partial schematic representation of the apparatus for transferring objects of FIG. 1, the individual gripping members being in their rest position, the linear actuator being in its disengaged position, the actuator rod of the linear actuator being in its folded position.
Figure 7:
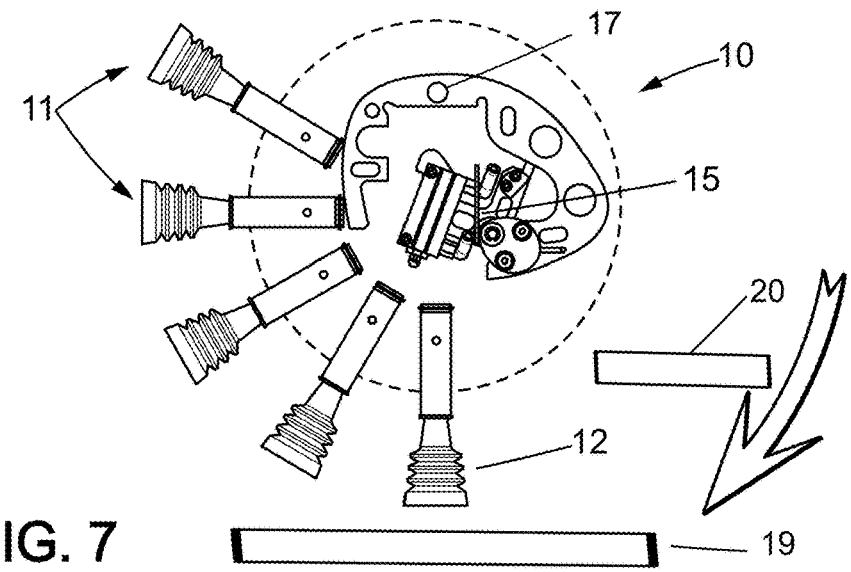
FIG. 7 is a partial schematic representation of the apparatus for transferring objects of FIG. 1, the individual gripping members being in their rest position, the actuator rod of the linear actuator being in its folded position, said linear actuator changing from its disengaged position to its engaged position under the effect of a torsion spring.
Figure 8:
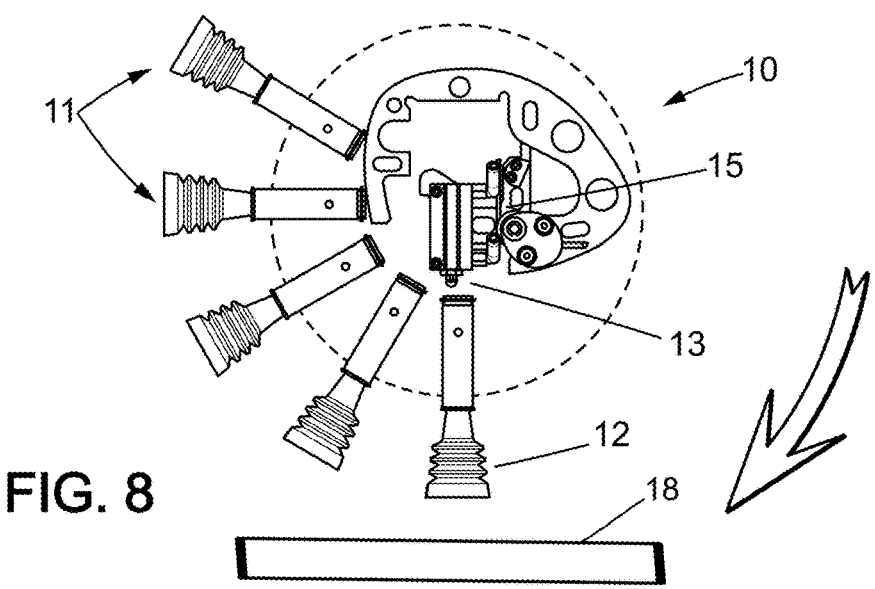
FIG. 8 is a partial schematic representation of the apparatus for transferring objects of FIG. 1, the individual gripping members being in their rest position, the actuator rod of the linear actuator being in the folded position, the linear actuator being in its engaged position ready to move an individual gripping member to grip an egg.

FIGS. 1 to 8 schematically and partially show a device for transferring eggs according to a particular embodiment of the present invention.

These eggs are placed in containers transported by a straight conveyor (not shown) along a conveying path defining an axis of movement of these containers.

This straight conveyor, which is of the endless belt type, comprises a control unit (not shown) controlling the transport speed of the containers.

This apparatus for transferring objects is here implemented to selectively remove these moving containers of eggs identified as being defective, for example during a prior step of examining them.

These defective eggs are transported by the apparatus and transferred to the belt of another conveyor to be evacuated. They are for example deposited in containers on this evacuation belt.

This apparatus comprises a rotating take-off roller 10 and having on its outer surface individual gripping members 11 regularly spaced apart. These individual gripping members 11 are therefore distributed in the form of a ring.

More specifically, the exterior surface of this take-off roller 10 comprises orifices in each of which a free end of an individual gripping member 11 is received, namely its piston, this individual gripping member 11 being translationally movable in its corresponding orifice. The piston of each individual gripping member 11 carries a suction cup 12 for gripping an egg.

On a segment, or portion, of circular path traveled by these individual gripping members 11 during the rotation of the take-off roller 10, these suction cups 12 are placed under suction relative to the surrounding air so that they are pressed against the outer surface of the take-off roller 10. They are then in their so-called rest position.

This depressurization is obtained by pumping an interior volume of the take-off roller 10, also called a depressurization chamber, this interior volume communicating with the orifices of the take-off roller 10 moving in this circular path segment. To do this, the apparatus comprises a pumping unit (not shown).

This apparatus comprises a linear actuator 13 which here is a pneumatic cylinder, which is placed inside the take-off roller 10, to selectively and individually activate the individual gripping members 11.

For this, when an individual gripping member 11 to be activated faces this linear actuator 13 during the rotation of the take-off roller 10, the actuator rod of this linear actuator 13 is moved from its folded position to its deployed position to come into contact with the end of the piston of this individual gripping member 11 in order to move said member between its rest position and a gripping position in which said member extends radially protruding outside the take-off roller to grip an egg.

This linear actuator 13 is fixedly mounted on a rotatable support 14 so that the free end of this linear actuator 13, being in its deployed position or in an intermediate position between its deployed position and its folded position, it is freely moved between an engaged position to a disengaged position when it comes into contact with another individual gripping member 11, in its rest position, carried by said rotating take-off roller 10.

In this disengaged position, this actuator is spaced from the individual gripping members 11 and does not risk being damaged.

The apparatus also comprises a return member 15 for returning this actuator from its disengaged position to its engaged position when its actuator rod is in its folded position so that the linear actuator 13 is ready to activate an individual gripping member 11 again.

Purely by way of illustration, this return member 15 is here a torsion spring.

This protection device of the linear actuator 13 advantageously makes it possible to achieve rotational speeds of the take-off roller 10 greater than 30 revolutions/min.

The invention claimed is:

1. An apparatus for transferring objects comprising:
   an object take-off roller (10) comprising, on its periphery, members (11) for individually gripping said objects,
   a device for rotating said object take-off roller (10),
   said individual gripping members being arranged in at least one ring, said apparatus comprising, for each ring, a linear actuator (13), placed in the interior volume defined by said roller, for moving an individual gripping member (11) appearing opposite this linear actuator (13) between a rest position and a gripping position in which this individual gripping member (11) extends radially, projecting from this take-off roller (10) to grip an object, the gripping position being obtained by one free mobile end of said linear actuator (13) bearing against said individual gripping member (11), said take-off roller (10) being configured to move an individual gripping member (11) in its rest position one by one in front of each linear actuator (13) as it rotates, characterized in that
   the free end of said linear actuator (13) being mobile between a folded position and a deployed position in which this free end is in contact with an individual gripping member (11), this linear actuator (13) is rotationally mobile between at least an engaged position and a disengaged position such that, with the free end of said linear actuator (13) being in its deployed position or in an intermediate position between its deployed position and its folded position, said linear actuator (13) is freely moved from its engaged position to its disengaged position when it comes into contact with another individual gripping member (11), in its rest position, carried by said rotating take-off roller (10),
   said disengaged position corresponding to a position in which said actuator is spaced apart from said individual gripping members, said assembly comprising a return member (15) to return said actuator from its disengaged position to its engaged position when the free end of said actuator is in its folded position or in an intermediate position not able to interact with an individual gripping member (11) in its rest position.

2. The apparatus for transferring objects according to claim 1, characterized in that said return member (15) for returning said linear actuator (13) from its disengaged position to its engaged position is a spring member or a magnetic attraction device.

3. The apparatus for transferring objects according to claim 2, characterized in that said spring member is a torsion spring.

4. The apparatus for transferring objects according to claim 1, characterized in that it comprises means for detecting (16) the position of the free end of said linear actuator (13), which is connected to said return member (15) in order to control its triggering.

5. The apparatus for transferring objects according to claim 1, characterized in that said linear actuator (13) is fixedly mounted on a rotatable support, said support being configured to move said linear actuator (13) between said engaged position and said disengaged position during its rotation.

6. The apparatus for transferring objects according to claim 1, characterized in that each of these individual gripping members comprises a piston provided with a suction cup (12) at its free end.

7. The apparatus for transferring objects according to claim 6, characterized in that the piston of each individual gripping member (11) is hollow and opens onto an orifice of the suction cup (12) to create a suction head.

8. The apparatus for transferring objects according to claim 6, characterized in that the piston of each individual gripping member (11) being received in an orifice of said take-off roller (10), said apparatus comprises a pumping unit for placing a part of an inner volume of said roller under vacuum and presses the suction cups (12) from the individual gripping members against the outer surface of said roller when these individual gripping members are moved in rotation by said roller on a circular path segment corresponding to said inner volume part thus placed under vacuum.

9. The apparatus for transferring objects according to claim 1, characterized in that said device for rotating this object take-off roller (10) is configured so that the speed of rotation of the objects take-off roller (10) is greater than or equal to 20 revolutions/min and even better still at 30 revolutions/min.

10. The apparatus for transferring objects according to claim 1, characterized in that said linear actuator (13) is an electromechanical actuator, a pneumatic actuator or even a hydraulic actuator.

11. The apparatus for transferring objects according to claim 8, characterized in that it comprises means for interrupting the vacuum on another circular path segment of the individual gripping members in order to release the objects at at least one predetermined deposition point.

12. The apparatus for transferring objects according to claim 1, characterized in that it comprises a cleaning device placed inside said roller for jetting pressurized water into said roller when this cleaning device is connected to a pressurized water supply source.

13. The apparatus for transferring objects according to claim 1, characterized in that it comprises in its lower part a waste water recovery tank.

14. An egg processing facility comprising an apparatus for transferring objects according to claim 1, a first conveyor for moving eggs in line with said transfer apparatus and a second conveyor to evacuate the eggs gripped from the first conveyor by said egg transfer apparatus.

15. An egg processing facility according to claim 14, characterized in that the first conveyor comprising n egg transport paths with n being greater than or equal to 2, the take-off roller (10) comprises n rings of individual gripping members, and consequently, the transfer apparatus comprises n linear actuators (13).

* * * * *